Patented July 3, 1928.

1,675,402

UNITED STATES PATENT OFFICE.

ARTHUR BINZ AND CURT RÄTH, OF BERLIN, GERMANY.

METHOD OF PREPARING NITROPYRIDINE ARSINIC ACIDS.

No Drawing. Application filed July 28, 1927, Serial No. 209,170, and in Germany August 5, 1926.

Attempts to nitrate substituted pyridine arsinic acids, e. g. 2-hydroxy-pyridine-5-arsinic acid, in which mild nitrating agents were used in order to avoid the breaking off of the arsinic residue or the breaking down of the substituted pyridine ring, have shown that either absolutely no nitration results or that this takes place only incompletely and unsatisfactorily.

According to this invention it has now been shown in a surprising manner that it is possible to convert substituted pyridine arsinic acids, particularly those containing as substituents hydroxyl or halogen groups, such as 2-hydroxy-pyridine-5-arsinic acid or 2-halogen-pyridine-5-arsinic acid by the use of energetically reacting nitration methods, smoothly and with the production of good yields, into nitro compounds, without the feared secondary reaction, such as the breaking off of the arsenic residue or the breaking down of the substituted pyridine ring taking place.

The nitrated pyridine arsinic acids prepared according to this invention possess therapeutically valuable properties; they further form starting materials for the production of other valuable compounds. In this way therapeutically valuable compounds can be obtained, for example by treating the nitrated arsinic acids with reducing agents.

The following example illustrates the production of one compound according to the invention:

100 grms. of 2-hydroxy-pyridine-5-arsinic acid are dissolved in 200 grms. of concentrated sulphuric acid. 125 grms. of red fuming nitric acid are slowly added to the hand-warm solution with stirring. The nitrating mixture is next warmed for about one hour on a vigorously boiling waterbath and then poured into 1.2 litres of water. Crystallization starts immediately. The resulting 2-hydroxy-3-nitro-pyridine-5-arsinic acid is easily recrystallized from water. It is then obtained as shining yellowish-green plates, which are easily soluble in alkali-metal hydroxide and alkali-metal carbonate. The graphical formula of the new product is

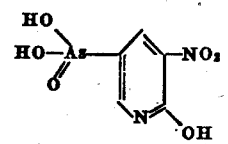

By the foregoing method, given by way of an example, it is possible to introduce the nitro group into the position next to the hydroxyl group, which so far as we are aware has not up till now been attained.

The 2-hydroxy-3-amino-pyridine-5-arsinic acid obtained by the reduction of the 2-hydroxy-3-nitro-pyridine-5-arsinic acid possesses strong bactericidal properties, especially as regards trypanosomes, as well as being very non-poisonous.

It is known that the nitro group can be introduced into aryl-arsinic acid. The success of the foregoing reaction could not be concluded from this however. According to Meyer and Jacobsen, vol. 2, Part III, page 843, nitric acid in some cases reacts so vigorously with pyridine compounds, which contain substituents, as, for example, the hydroxyl group, that in place of nitro derivatives, products of far reaching oxidation are obtained. It was therefore in no way to be anticipated, that in the foregoing case, even by the use of very vigorous nitrating agents, as, for example, red fuming nitric acid, neither a breaking off of arsenic nor an oxidizing decomposition takes place.

We claim:

1. Method of preparing nitropyridine arsinic acids, comprising the step of treating substituted pyridine arsinic acids with energetically reacting nitrating agents.

2. Method of preparing nitropyridine arsinic acids, comprising the step of treating pyridine arsinic acids, which contain a hydroxyl group, with energetically reacting nitrating agents.

3. Method of preparing nitropyridine arsinic acids, comprising the step of treating 2-hydroxy-pyridine-5-arsinic acid with energetically reacting nitrating agents.

4. Method of preparing nitropyridine arsinic acids, comprising the step of treating pyridine arsinic acids, which are substituted in the ortho position to the nitrogen, with energetically reacting nitrating agents.

5. Method of preparing nitropyridine arsinic acids, comprising the step of treating pyridine arsinic acids which contain a hydroxyl group in the ortho position to the nitrogen, with energetically reacting nitrating agents.

6. Method of preparing nitropyridine arsinic acids, comprising the step of treating substituted pyridine arsinic acids with red fuming nitric acid.

In testimony whereof we affix our signatures.

ARTHUR BINZ.
CURT RÄTH.